July 26, 1927.

A. H. SKAER ET AL 1,637,012

LUBRICATING SYSTEM FOR ROCK DRILL SHARPENERS

Filed Aug. 11, 1923

July 26, 1927. 1,637,012
A. H. SKAER ET AL
LUBRICATING SYSTEM FOR ROCK DRILL SHARPENERS
Filed Aug. 11, 1923 2 Sheets-Sheet 2
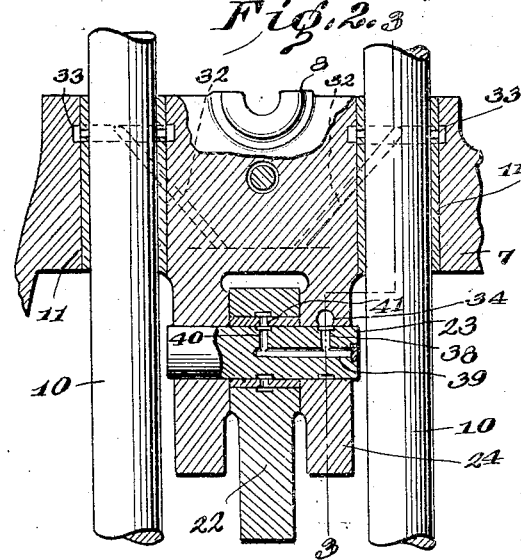
Fig. 2.3
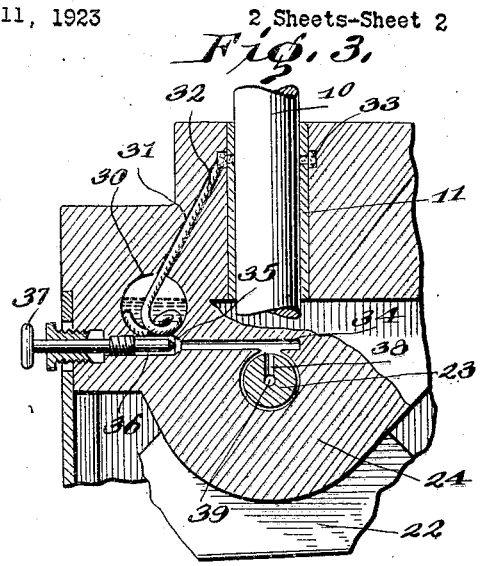
Fig. 3.
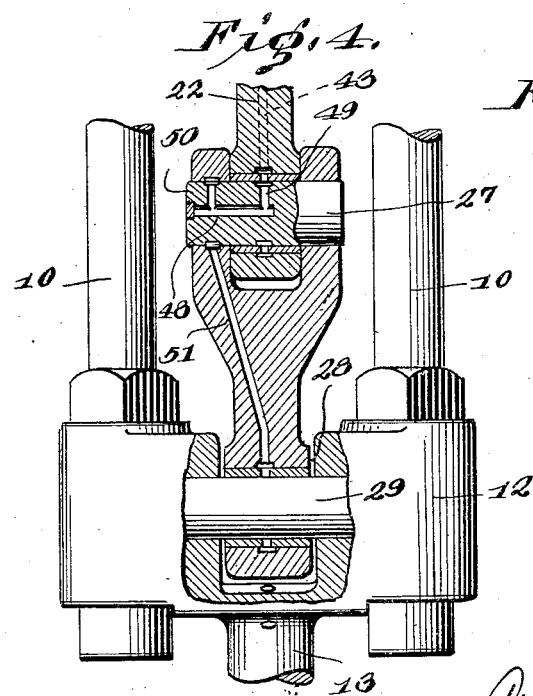
Fig. 4.
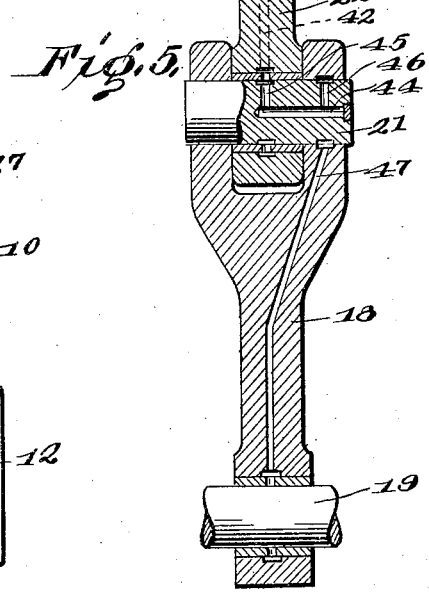
Fig. 5.
Inventors
Arthur H. Skaer & Omar E. Clark
By
Attorney Patented July 26, 1927.

1,637,012

UNITED STATES PATENT OFFICE.

ARTHUR H. SKAER AND OMAR E. CLARK, OF DENVER, COLORADO, ASSIGNORS TO THE DENVER ROCK DRILL MANUFACTURING COMPANY, OF DENVER, COLORADO, A CORPORATION OF DELAWARE.

LUBRICATING SYSTEM FOR ROCK-DRILL SHARPENERS.

Application filed August 11, 1923. Serial No. 656,984.

The present invention relates to forging apparatus, and more particularly machines for dressing or sharpening rock drills, and the object is to provide a novel and effective lubricating system, whereby the various bearings that are not readily accessible, will receive a proper supply of lubricant.

In the accompanying drawings:—

Figure 2 is a detail sectional view on the line 2—2 of Figure 1,

Figure 3 is a sectional view on the line 3—3 of Figure 2,

Figure 1:
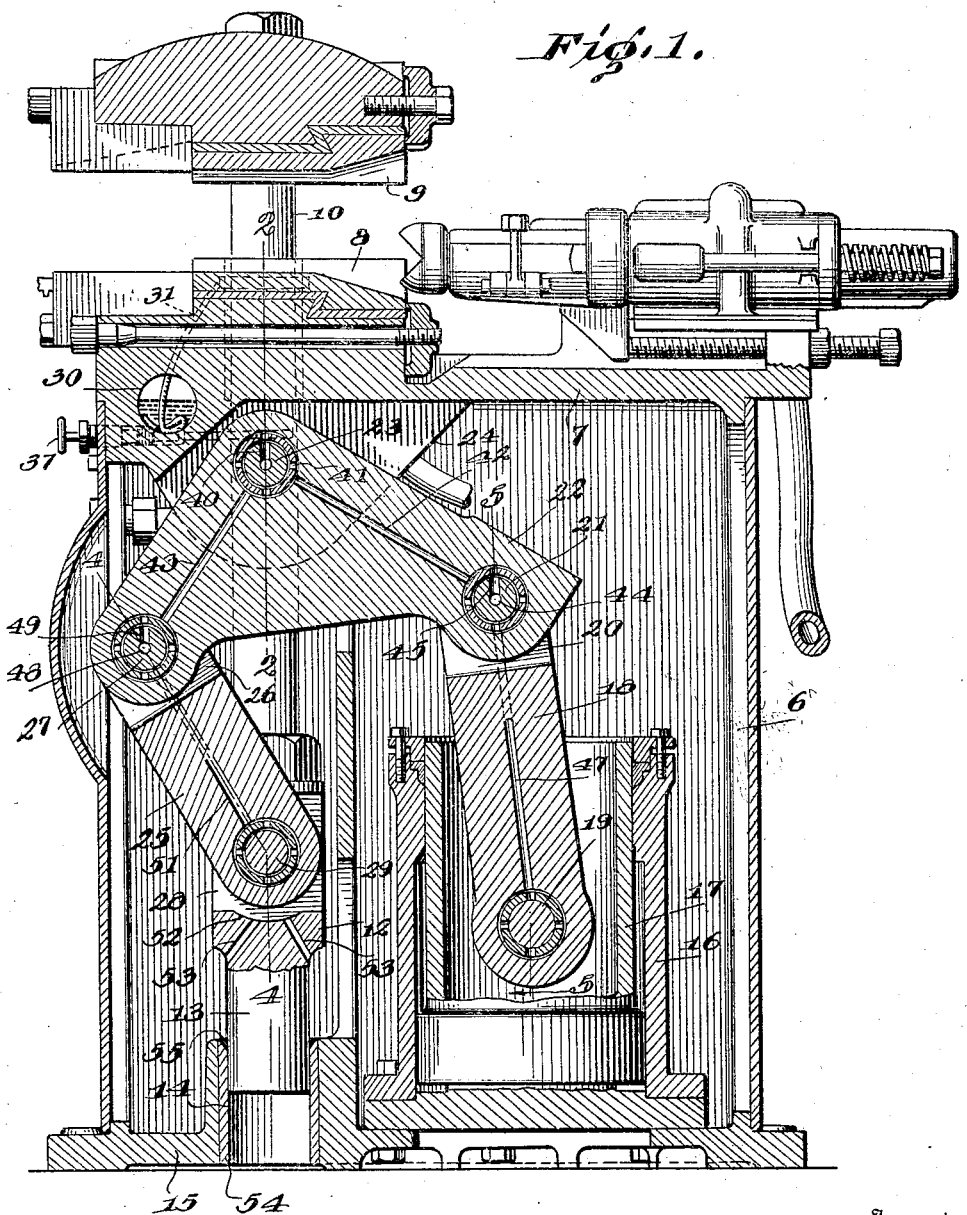
Figure 1 is a vertical sectional view through a rock drill sharpener, and illustrating the lubricating system.

Figures 4 and 5 are sectional views respectively on the line 4—4 and 5—5 of Figure 1.

In the embodiment disclosed, a base or support is employed, comprising a casing 6 having a platform 7 supporting a stationary die 8. A movable die 9 reciprocates to and from a coacting position with respect to the die 8, and is carried by spaced slide rods 10 having bearings 11 in the said platform 7. The rods 10 are connected at their lower ends by a cross head 12 having a depending stem 13 that is slidably mounted in a vertical bearing box 14 formed on the bottom 15 of the casing 6.

A motor is housed within the rear portion of the casing and includes a vertical cylinder 16 containing a reciprocatory piston 17, and a link or pitman 18 has a pivotal mounting 19 at its lower end in and on the piston 17. The upper end of the link or pitman 18 is bifurcated to provide a pair of ears 20 connected by a pivot pin 21, and this pivot pin is engaged in one end of a lever 22 that is fulcrumed, as shown at 23, to ears 24 depending from the platform 7. Another link 25 has its upper end bifurcated, as shown at 26, to receive the other end of the lever 22, and a pivot pin 27 connects said lever and link. The lower end of the lever 25 is located in a recess 28 formed in the cross head 12, and has a pivotal mounting 29 in said cross head. The various bearings are preferably bushed in the usual manner.

Formed in the front end of the platform 7 is a lubricant reservoir 30 and bores 31 lead from the upper portion of the reservoir to the upper bearings 11 of the rods 10. In these bores are placed wicks 32 having their lower ends submerged in the lubricant in the reservoir and their upper ends in contact with absorbent washers 33. Thus the bearings 11 for the rods 10 are lubricated.

Leading from the bottom of the reservoir 30 is a lubricant conduit 34 having a tapered portion 35 forming a valve seat. A needle valve 36 cooperates with the seat to control the passage of lubricant through the conduit 34 from the reservoir. This valve has an exposed operating handle 37. The inner or rear end of the conduit 34, as shown particularly in Figures 2 and 3, is in communication with a port 38 leading to an axial bore 39 in one end portion of the fulcrum pin 23. The bore 39 also communicates with a port 40 that opens into suitable channels 41 formed in the fulcrum bearing of the lever 22. This lever is furthermore provided with branch passageways 42 and 43 that lead respectively to the pivots 21 and 27 of the links 18 and 25. In the pivot 21 is formed an axial bore 44 having an inner port 45 communicating with the pivot bearing and an outer port 46 that communicates with a channel 47 extending longitudinally in the link 18 to the pivot bearing 19. The pivot 27 is provided with an axial bore 48 having an inner port 49 communicating with the bearing and an outer port 50 that is in communication with a passageway 51 leading to the pivot bearing 29. It will be noted particularly by reference to Figures 1 and 4 that the bottom of the socket 28 is in the form of a cup 52 that is directly below the pivot bearing 29, and from this socket outwardly extending ports 53 lead to the exterior of the stem 13. The bushing 54 of said stem has its upper end flared, as shown at 55.

With this construction, it will be evident that lubricant will flow from the reservoir 30 through the conduit 34, and lubricate the fulcrum of the lever 22. The surplus lubricant will be transmitted by the branch passageways 42 and 43 to the bearings 21 and 27, and from the bearing 21 to the bearing 19 between the link 18 and the motor piston 17. Lubricant will also flow from the bearing 27 to the bearing 29 and any excess will gravitate into the cup 52 of the cross head 12. From said cup 52 the lubricant will pass through the ports 53 and finding its way down the stem 13 will be directed by the flared portion 55 of the bushing 54, thereby lubricating the reciprocatory bearing of the stem 13 in the bearing bores 14.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus fully described our invention, what we claim as new, and desire to secure by Letters Patent, is:—

1. In drill sharpening apparatus, the combination with a base or support, of relatively movable coacting dies mounted on the support, a lever fulcrumed on the support, a motor, an operating connection between the motor and the lever, including a link having a bearing on the lever, an operating connection between the lever and one of the dies, including a link having a bearing on the lever, means for supplying lubricant to the fulcrum of the lever, and passageways for transmitting lubricant from the fulcrum to the bearings of both links.

2. In drill sharpening apparatus, the combination with a base or support, of relatively movable coacting dies mounted on the support, a lever fulcrumed between its ends on the support, a motor, an operating connection between the motor and the lever, including a link having a bearing on one end of the lever, an operating connection between the lever and one of the dies, including a link having a bearing on the other end of the lever, means for supplying lubricant to the fulcrum of the lever, and passageways in both arms of the lever leading in opposite directions from the fulcrum bearing to both link bearings for transmitting lubricant from the former to the latter.

3. In a drill sharpening apparatus, the combination with a base or support, of a movable die member on the base or support, a movable carrier for the die member, a lever fulcrumed on the base or support, a link connection between the lever and the carrier having bearings on both, a lubricant reservoir, a passageway from the reservoir to the fulcrum of the lever, a passageway in the lever from the fulcrum to the bearings of the link thereon, and a passageway in the link between its said bearings.

4. In a drill sharpener, the combination with a base or support, of a movable die member on the base or support, a lever fulcrumed on the base or support, a link connection pivoted to the lever and to the movable die member, means for lubricating the fulcrum of the lever, a lubricant passageway in the lever leading downwardly from the fulcrum to the pivotal connection of the link therewith, and a lubricant passageway in the link leading downwardly from said pivotal connection to the pivotal connection with the movable die member.

5. In a drill sharpener, the combination with a base or support, of a movable die member on the base or support, a lever fulcrumed on the base or support and having a connection with the movable die member, a motor having a piston below the lever, a link pivoted to the lever and to the motor piston, means for lubricating the fulcrum of the lever, a lubricant passageway in the lever leading downwardly from the fulcrum to the pivotal connection of the link therewith, and a lubricant passageway in the link leading downwardly from said pivotal connection to the pivotal connection with the piston.

6. In a drill sharpener, the combination with a base or support, of a movable die member on the base or support, a lever fulcrumed between its ends on the base or support, a link extending downwardly from one arm of the lever and pivoted thereto and to the movable die member, a motor including a piston below the other arm of the lever, a link extending downwardly from said other arm of the lever and pivoted thereto and to the piston, means for lubricating the fulcrum of the lever, passageways in the arms of the lever leading downwardly from the fulcrum to the pivots that connect the links therewith, and passageways in the links leading downwardly from said pivots to the pivots that connect them respectively to the movable die member and to the piston.

7. In a drill sharpening apparatus, the combination with a base or support, of a movable die member, a reciprocatory carrier for the die member having a sliding bearing in the base or support, operating means for reciprocating the carrier, having a bearing thereon, means for supplying lubricant to the bearing of the operating means, and means for transmitting lubricant so supplied to the sliding bearing.

8. In a drill sharpening apparatus, the combination with a base or support, of a movable die member, a reciprocatory carrier for the die member having a sliding bearing on the base or support, operating means for reciprocating the carrier, including a link having a pivot bearing on the carrier, means for supplying lubricant to the bearing of the link, and means for transmitting lubricant so supplied to the sliding bearing.

9. In a drill sharpening apparatus, the combination with a base or support, of a movable die member, a reciprocatory carrier for the die member, a bearing box in which a portion of the carrier slidably reciprocates, operating means for reciprocating the carrier, including a link pivoted to the carrier above the bearing box, means for supplying lubricant to the carrier, said carrier having a lubricant receiver cup below the link bearing, and a passageway from the cup for directing lubricant to the bearing box.

10. In a drill sharpening apparatus, the combination with a base or support, of a movable die, a reciprocatory carrier for the die including a stem, a bearing box in which the stem operates, a lever fulcrumed on the base or support, means for rocking the lever, a link pivoted to the lever and to the carrier for transmitting movement from the former to the latter, a lubricant reservoir, a lubricant conduit from the reservoir to the fulcrum, a passageway in the lever for conveying lubricant from the fulcrum to the pivot of the link thereon, a passageway in the link connecting the pivots thereof for conveying lubricant from one to the other, and means for directing lubricant from the link pivot on the carrier to the bearing box for the carrier.

11. In a drill sharpening apparatus, the combination with a base or support, of a movable die, a reciprocatory carrier for the die, including a stem, a bearing box in which the stem operates, a lever fulcrumed between its ends on the base or support, a motor, a link pivoted to the motor and to one end of the lever, a second link pivoted to the other end of the lever and to the carrier for transmitting motion to the latter, a lubricant reservoir, a lubricant conduit leading from the reservoir to the fulcrum, branch passageways in the lever leading from the fulcrum to the respective bearings of the links, passageways in the links leading to the bearings of the motor and carrier respectively, and means for directing lubricant from the bearing of the second link on the carrier to the bearing box for said carrier.

In testimony whereof, we affix our signatures.

ARTHUR H. SKAER.
OMAR E. CLARK.